(12) United States Patent
Lee et al.

(10) Patent No.: US 6,270,851 B1
(45) Date of Patent: *Aug. 7, 2001

(54) PROCESS FOR MANUFACTURING RESIN-COATED FIBERS COMPOSITE AND AN APPLICATION THEREOF

(75) Inventors: Jae-Shik Lee; Soun-Hie Park; Soon-Ho Park; Deog-Man Baek, all of Taejeon (KR)

(73) Assignee: Daelim Industrial Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,376

(22) Filed: Jul. 14, 1998

(30) Foreign Application Priority Data

Jul. 14, 1997 (KR) .............................. 1997-32586

(51) Int. Cl.$^7$ ........................................ B05D 1/18
(52) U.S. Cl. ................... 427/434.7; 427/434.6; 118/405; 118/420; 156/441; 156/296
(58) Field of Search ................ 427/434.3, 434.6, 427/434.7; 118/405, 420; 156/441, 296

(56) References Cited

U.S. PATENT DOCUMENTS

| | | | | |
|---|---|---|---|---|
| 3,730,680 | * | 5/1973 | Bowen et al. | 8/151.2 |
| 3,766,581 | * | 10/1973 | Inoue et al. | 8/151.2 |
| 4,728,387 | * | 3/1988 | Hilakos | 118/420 |
| 4,939,002 | * | 7/1990 | Hilakos | 427/434.6 |
| 5,133,282 | * | 7/1992 | Bates et al. | 427/434.6 |
| 5,540,797 | * | 7/1996 | Wilson | 156/441 |
| 5,869,178 | * | 2/1999 | Kusy et al. | 428/335 |

* cited by examiner

Primary Examiner—Katherine A. Bareford
(74) Attorney, Agent, or Firm—Fulbright & Jaworski L.L.P.

(57) ABSTRACT

An apparatus for producing a resin coated fiber composite of a rod shape, tubular-shape or plate shape comprises a plurality of first members having an annular shape with a semi-circular ring shaped internal surface, second members having a disc shape with a semicircular ring shaped external surface, first connectors for assembling the first members, second connectors for assembling the second members, an outer die member semi-assembled with the first members and connectors, an inner die member semi-assembled with the second members and connectors, a heater, an inlet nozzle and an outlet nozzle, a zigzag shaped tunnel formed between the inner and outer die members for providing a narrow flow path of the fiber filaments, and resin inlet ports to fill the molten resin in the zigzag shaped tunnel and pressurize the flow path of the fiber filaments. A process for preparing a resin coated fiber composite of a rod-shape, tubular-shape or plate-shape comprises steps of spreading fiber filaments by passing the fiber filaments through a first member having a convex-concave portion to prevent fracture of the fiber filaments, and sequentially tensioning through a series of first and second members all along a narrow flow path to maximize molten resin penetrating surface area, impregnating pressurized molten resin into the fiber filaments continuously by passing the fiber filaments through a series of the first and second members all along the narrow flow path of a zigzag shaped tunnel to maximize molten resin penetrating time, and wherein pressurization of the molten resin maximizes penetration of molten resin into pores of the fiber filaments and minimizes possibility of resin degradation, stranding the resin-coated fiber filaments through a final set of the first members having the convex-concave portion for strengthening the fiber filaments, and integrating and pultruding the resin-coated fiber filaments continuously by passing the fiber filaments all along the narrow flow path of the zigzag shaped tunnel to form a desired diameter through the outlet nozzle.

5 Claims, 4 Drawing Sheets

A. EMBOSSING TYPE   B. SCRATCH TYPE   C. SMOOTH TYPE

FIG. 5

A. EMBOSSING TYPE   B. SCRATCH TYPE   C. SMOOTH TYPE

PROCESS FOR MANUFACTURING RESIN-COATED FIBERS COMPOSITE AND AN APPLICATION THEREOF

TECHNICAL FIELD

1. Field of the Invention

The present invention relates to an apparatus and an economical process for continuously coating fiber filaments by passing the fiber filaments through a molten resin closed die. More particularly, the present invention relates to an apparatus and an economical process for continuously coating the fiber filaments wherein each filament of a fiber bundle is coated continuously in a narrow flow path of a zigzag shaped tunnel formed between an inner die member and an outer die member along the fiber filaments moving direction.

2. Description of Prior Art

For the coating of a fiber bundle, the resin should be impregnated enough into a bed layer of the fiber bundle which is composed of quite a lot of fiber filaments while the fiber bundle stays in the resin of the die so that the fiber filaments may be drenched as much as possible.

According to the theory, in order to satisfactorily obtain a well impregnated resin coated fiber bundle, it is required to increase the penetrating time T, the space or pores between the fiber filaments S, the pressure P and the contact area Ac between the molten resin and the external layer of the fiber bundle for impregnating the resin into the fiber bundle, while the viscosity of the resin V and the depth Dp of the fiber bundle for penetrating the resin into the fiber bundle are decreasing.

Based on such principle, processes for coating fibers which have been used widely up to now can be classified into the following two categories, one being a process which employs cylindrical pins or lobes along with fiber tension to spread apart monofilaments and promote resin impregnation of the fiber bundle in a molten resin die. The process aims for the improvement of impregnation of fibers by the effect of the penetrating time T, the pressure P mainly and the contact area Ac partially.

Another process enhances the impregnation of the fibers by alternating convex and concave pins in a molten resin bath or a die whereby the effect of reducing the depth Dp of the fiber bundle is added to the first process by introducing the concept for spreading the fibers.

As a method for producing fiber composite material by using the first process, U.S. Pat. Nos. 3,993,726, 4,439,387, 4,549,920 are disclosed.

As another method by using the second process, U.S. Pat. Nos. 4,728,387, 4,864,964, 4,939,002 are disclosed. This process showed the fibers on a convex pin could be spread widely.

As another method by using the second process, U.S. Pat. Nos. 5,133,282, 5,236,743 showed a concave pin which can make a single point to group the fibers, and a convex pin and their combination designed by an approximate equation. The convex pin which has a distribution of radius centered by a horizontal axis is symmetrical relative to a central maximum radius. The convex and the concave pins make it possible to spread very widely the fibers on the convex pin provided that all the individual lengths of filaments in a fiber bundle are same between an concave pin and another concave pin.

Actually it is very difficult to be same the filaments lengths from die inlet to die outlet because the approximate equation is literally approximated comprising assumptions, and there are quite a few parameters in association with the shapes of the pins and their alignment. It is very difficult to consider all the design parameters and to avoid the extreme breakage of filaments due to different velocity between adjacent fibers at high production rate. Thus, not only mechanical property of the end product is lowered dramatically but also the increasing of the yield velocity would meet many limitations. Moreover, in producing many fiber-reinforcement strands, when the above-shaped pins are used, the volume of the die or resin bath has to be increased so inefficiently that the resin-residence time in the die or resin bath is increased and the risk of resin decomposition is arisen.

SUMMARY OF THE INVENTION

The present invention is intended to overcome the above difficulties of the conventional processes.

An objective of the present invention is to provide an apparatus for preparing a resin coated fiber composite of a rod shape, tubular-shape or plate shape, comprising a plurality of first members having an annular shape with a semi-circular ring shaped internal surface, a plurality of second members having a disc shape with a semi-circular ring shaped external surface, a plurality of first connectors for assembling the first members, a plurality of second connectors for assembling the second members, an outer die member semi-assembled with the plurality of the first members and the first connectors, an inner die member semi-assembled with the plurality of the second members and the second connectors, a heater disposed outside of the outer die member, the heater being a primary heat source for heating molten resin, an inlet nozzle for inlaying fiber filament bundles, an outlet nozzle for outlying fiber filament bundles, a zigzag shaped tunnel formed between the inner die member and the outer die member for providing a flow path of the fiber filaments, and a plurality of resin inlet ports disposed at a center surface section of the outer die member to fill molten resin in the zigzag shaped tunnel, and pressurize the flow path of the fiber filaments.

Another objective of the present invention is to provide the zigzag shaped tunnel for continuously contacting the fiber filaments with the pressurized molten resin in the flow path, the fiber filaments are dispersing and forwarding to an imaginary angle point of a cone shape along with the semi-circular ring shaped internal surface of the first member and the semicircular ring shaped external surface of the second member alternately, the cross sectional areas of the zigzag shaped tunnel varies through the flow path, and the fiber filaments are maintained constant length and tension all along the flow path.

Another objective of the present invention is to provide the semi-circular ring shaped internal surface of the first member and the semi-circular ring shaped external surface of the second member are either one type of embossed, uneven or even type.

Another objective of the present invention is to provide the semi-assembled outer die member and the semi-assembled inner die member are fixed to the inlet nozzle and the outlet nozzle through a plurality of axis.

Another further objective of the present invention is to provide a process for preparing a resin coated fiber composite of a rod-shape, tubular-shape or plate-shape, a plurality of fiber filaments being continuously coated in a manner of alternating sequence through a narrow flow path of a zigzag shaped tunnel formed between an inner die member and an outer die member, the process comprising steps of: spreading the plurality of fiber filaments by passing through a first member having a convex-concave portion of a semicircular ring shaped internal surface to prevent fracture of the fiber filaments, and sequentially by tensioning through a series of a second member having a semi-circular ring shaped external surface and the first member having the semi-circular ring shaped internal surface all along the narrow flow path of the zigzag shaped tunnel to maximize molten resin penetrating surface area; impregnating pressurized molten resin into a plurality of widely spreaded fiber filaments continuously by passing through the series of the first and second members all along the narrow flow path of the zigzag shaped tunnel to maximize molten resin penetrating time, wherein the pressurized molten resin is filled in the narrow flow path of the zigzag shaped tunnel, supplied from a plurality of resin inlet ports disposed at a center surface section of the outer die member, and exerted toward both ends of nozzles, and wherein pressurization of the molten resin maximizes penetrating the molten resin into pores of the fiber filaments and minimized possibility of resin degradation; stranding a plurality of resin-coated fiber filaments continuously by passing through a final set of the first member having the convex-concave portion of the semi-circular ring shaped internal surface for strengthening the fiber filaments; and integrating and pultruding the plurality of resin coated fiber filaments continuously by passing all along the narrow flow path of the zigzag shaped tunnel to form a desired diameter through the outlet nozzle.

Another objective of the present invention is to provide the process that the fiber filaments are passed through the zigzag shaped tunnel to contact continuously with the pressurized molten resin in the narrow flow path, dispersing and forwarding an imaginary angle point of a cone shape along with the semi-circular ring shaped internal surface of the first member and the semi-circular ring shaped external surface of the second member alternately, and the fiber filaments are maintained constant length and tension all along the narrow flow path of the zigzag shaped tunnel.

Another objective of the present invention is to provide further process that the fiber filaments are contacted with counter flow of the pressurized molten resin through front half of the narrow flow path, and contacted with parallel flow of the pressurized molten resin through rear half of the narrow flow path, and pressure of the pressurized molten resin varies through the narrow flow path due to variation of cross sectional area of the zigzag shaped tunnel.

Another objective of the present invention is to provide the further process that the tension exerted on the fiber filaments is less than 80 Kg-force per a fiber-reinforced strand having diameter from 1 to 10 mm.

Another objective of the present invention is to provide the further process that the resin coating is a thermoplastic resin having viscosity of from 100 CP (centpoise) to 5,000,000 poise.

On the other hand, the fiber breakage due to a grouping point on the concave pin or friction caused by the velocity difference between adjacent fibers can be prevented, and thus the property of the final product is kept from deterioration and an improvement of yield velocity can be obtained. Also, a difficulty of design, which would be arisen when trying to spread the fibers in maximum, can be overcome by the combination of the concave pin and the convex pin. Further, by minimizing the introducing path length of the resin, the resin residence time of the present inventions was remarkably decreased so that the risk of resin decomposition which can be arisen by lengthening the resin residence time in a die can be removed. In addition, the present invention makes the formation of multitude of fiber reinforcement strand ease in comparison whit the conventional processes and provides an apparatus and method capable of producing excellent high quality fiber composite.

DETAILED DESCRIPTION OF THE PRESENT INVENTION

The present invention relates to an apparatus assembly for producing a resin coated fiber composite of a rod shape, tubular-shape or plate shape comprises a plurality of first members 2 having an annular shape with a semi-circular ring shaped internal surface, a plurality of second members 5 having a disc shape with a semi-circular ring shaped external surface, a plurality of first connectors 1, 3 for assembling the first members 2, a plurality of second connectors 4, 6 for assembling the second members 5, an outer die member 17 semi-assembled with the plurality of the first members 2 and the first connectors 1, 3, an inner die member 16 semi-assembled with the plurality of the second members 5 and the second connectors 4, 6, a heater 9 disposed outside of the outer die member 17, the heater 9 being a primary heat source for heating molten resin, an inlet nozzle 7 for inlaying fiber filament bundles, an outlet nozzle 8 for outlying fiber filament bundles, a zigzag shaped tunnel 18 formed between the inner die member 16 and the outer die member 17 for providing a flow path 12 of the fiber filaments, and a plurality of resin inlet ports 13 disposed at a center surface section of the outer die member 17 to fill molten resin in the zigzag shaped tunnel 18, and pressurize the flow path 12 of the fiber filaments.

The present invention is also provided that the fiber filaments are passed the zigzag shaped tunnel 18 for continuously contacting with the pressurized molten resin in the flow path 12. The fiber filaments are dispersing and forwarding to an imaginary angle point of a cone shape along with the semi-circular ring shaped internal surface of the first member 2 and the semi-circular ring shaped external surface of the second member 5 alternately, the cross sectional areas of the zigzag shaped tunnel 18 varies through the flow path 12, and the fiber filaments are maintained constant length and tension all along the flow path.

Furthermore, the present invention is provided that the semi-circular ring shaped internal surface of the first member 2 and the semi-circular ring shaped external surface of the second member 5 are either one type of embossed, uneven or even.

The present invention is assembled with the semi-assembled outer die member 17 and the semi-assembled inner die member 16 are fixed to the inlet nozzle 7 and the outlet nozzle 8 through a plurality of axis 15.

The present invention also relates to a process for preparing a resin coated fiber composite of a rod-shape, tubular-shape or plate-shape. A plurality of fiber filaments are continuously coated in a manner of alternating sequence through a narrow flow path 12 of a zigzag shaped tunnel 18 formed between an inner die member 16 and an outer die member 17. The process comprises the steps of: (1) spreading the plurality of fiber filaments by passing the fiber filaments through a first member 2 having a convex-concave portion 20 of a semi-circular ring shaped internal surface to prevent fracture of the fiber filaments, and sequentially by tensioning through a series of a second member 5 having a semi-circular ring shaped external surface and the first member 2 having the semi-circular ring shaped internal surface all along the narrow flow path 12 of the zigzag shaped tunnel 18 to maximize molten resin penetrating surface area, (2) impregnating pressurized molten resin into a plurality of widely spreaded fiber filaments continuously by passing the fiber filaments through the series of the first and second members 2, 5 all along the narrow flow path 12 of the zigzag shaped tunnel 18 to maximize molten resin penetrating time, wherein the pressurized molten resin is filled in the narrow flow path 12 of the zigzag shaped tunnel 18, supplied from a plurality of resin inlet ports 13 disposed at a center surface section of the outer die member 17, and exerted toward both ends of nozzles 7, 8, and wherein pressurization of the molten resin maximizes penetrating the molten resin into pores of the fiber filaments and minimizes possibility of resin degradation, (3) stranding a plurality of resin-coated fiber filaments continuously by passing through a final set of the first member 2 having the convex-concave portion 20 of the semi-circular ring shaped internal surface for strengthening the fiber filaments, and (4) integrating and pultruding the plurality of resin coated fiber filaments continuously by passing the fiber filaments all along the narrow flow path 12 of the zigzag shaped tunnel 18 to form a desired diameter.

The present invention is also provided the process that the fiber filaments are passed through the zigzag shaped tunnel 18 to contact continuously with the pressurized molten resin in the narrow flow path 12, dispersing and forwarding an imaginary angle point of a cone shape along with the semi-circular ring shaped internal surface of the first member 2 and the semi-circular ring shaped external surface of the second member 5 alternately, and the fiber filaments are maintained constant length and tension all along the narrow flow path 12 of the zigzag shaped tunnel 18.

The present invention is further provided the process that the fiber filaments is contacted with counter flow of the pressurized molten resin through front half of the narrow flow path 12, and contacted with parallel flow of the pressurized molten resin through rear half of the narrow flow path 12, and pressure of the pressurized molten resin varies through the narrow flow path 12 due to variation of cross sectional area of the zigzag shaped tunnel 18.

The fiber filament suitable for the present invention may be one or more chosen from the group consisting of glass fiber of less than 50 $\mu$m diameter, carbon fiber, boron fiber, graphite fiber, aramid fiber, polyacrylate fiber, polyvinyl alcohol fiber, UHMWPE polyethylene fiber, PEN (polyethylene naphthalene) fiber, PET (polyethylene terephthalate) fiber, nylon fiber, metallic fiber, metallic coating fiber, natural fiber, etc., characterized in that the tension exerted on the fiber is less than 80 kg—force per resin fiber—reinforced stand having diameter from 1 to 10 mm.

The resin for coating is a thermosetting or thermoplastic resin having viscosity of from 100 CP (centipoise) to 5,000,000 poise. More particularly, the thermosetting resin may be selected from the group consisting of unsaturated polyester, epoxy, vinyl ester, phenol, melamine, urethane resin, polyimide, bis-maleic imide and the typical thermoplastic resins may be selected form the group consisting of PP (polypropylene), PE (polyethylene), EPDM (ethylene-propylene-diene rubber), EP (ethylenepropylene copolymer), MA-g-PP (Maleic anhydride graft polypropylene), Acid-g-PP (Acid graft polypropylene), MA-g-PE (Maleic anhydride graft polyethylene), PB (polybutaiene), PA (polyamide), ABS (Acrylic acid/butyl acrylate/styrene), PS (polystyrene), SAN (styrene acrylonitrile), SMA (styrene maleic anhydride), PVC (polyvinyl chloride), PET (polyethylene terephthalate), SEBS (Styrene ethylene butadiene-styrene), PC (polycarbonate), HIPS, K-resin, polyester, PBT (polybutylene terephthalate), polyacrylate, EPR (ethylenepropylene rubber), MA (Maleic anhydride) modified EPR, MA-graft-EPR, NBR (Nitrile rubber), MA-graft-NBR, EVOH (Ethylene vinyl alcohol), PPS (polypheniylsulfide), acetal, PU (polyurethane), PS-graft-EP, liquid crystal polymer, and multi-block copolymer including PE/PS, EP/PS, PE/PS/SEBS, PB/PS/SEBS, PE/HIPS/SEBS, PP/EPR, PP/PE, PE/PP/EP, PE/PP/EPDM, EP/PP/EP-graft-PP, PP/PA, PP/PA/MA-graft-PP, PP/PA/acid-graft-PP, PA/EPDM, PA/EPDM/MA-graft-EPDM, PA/PE/MA-graft-PP, PA/PE/MA-graft-PE, PA/EPR, PA/Anhydride or Acid modified EPR, PA/PE/ABS, PA/PE/PA-Polybutene, PA/PS, PA/PS/Styrene-Methancrylic acid, SAN/SMA, PA/PS/SAN, PA/PS/SMA, PA/SMA, PA/SAN/SMA, SAN/SMA, PE/PVC, PE/PET, PE/PET/SEBS, PE/PC, SEBS, PC/ABS, PC/PBT, PS/PB, PS/PB/SB and mixtures including PC/Polyester, PC/Polyarylate, MA-graft-NBR/PA, NBR/PA, EPR-based PA/PA, NBR/EPR-based PA/PA, PA/PP/SMA/MA-graft-PP, EVOH/SMA, PS/PA, Sulphonated PS/PA, PA/PE/MA-graft-PE, PA/PE/Acid-graft-PE, etc.

Best Mode for Carrying Out the Invention

The process of continuously coating the fiber and the apparatus assembly of the present invention are illustrated in more detail with reference to the figures attached.

Figure 1:
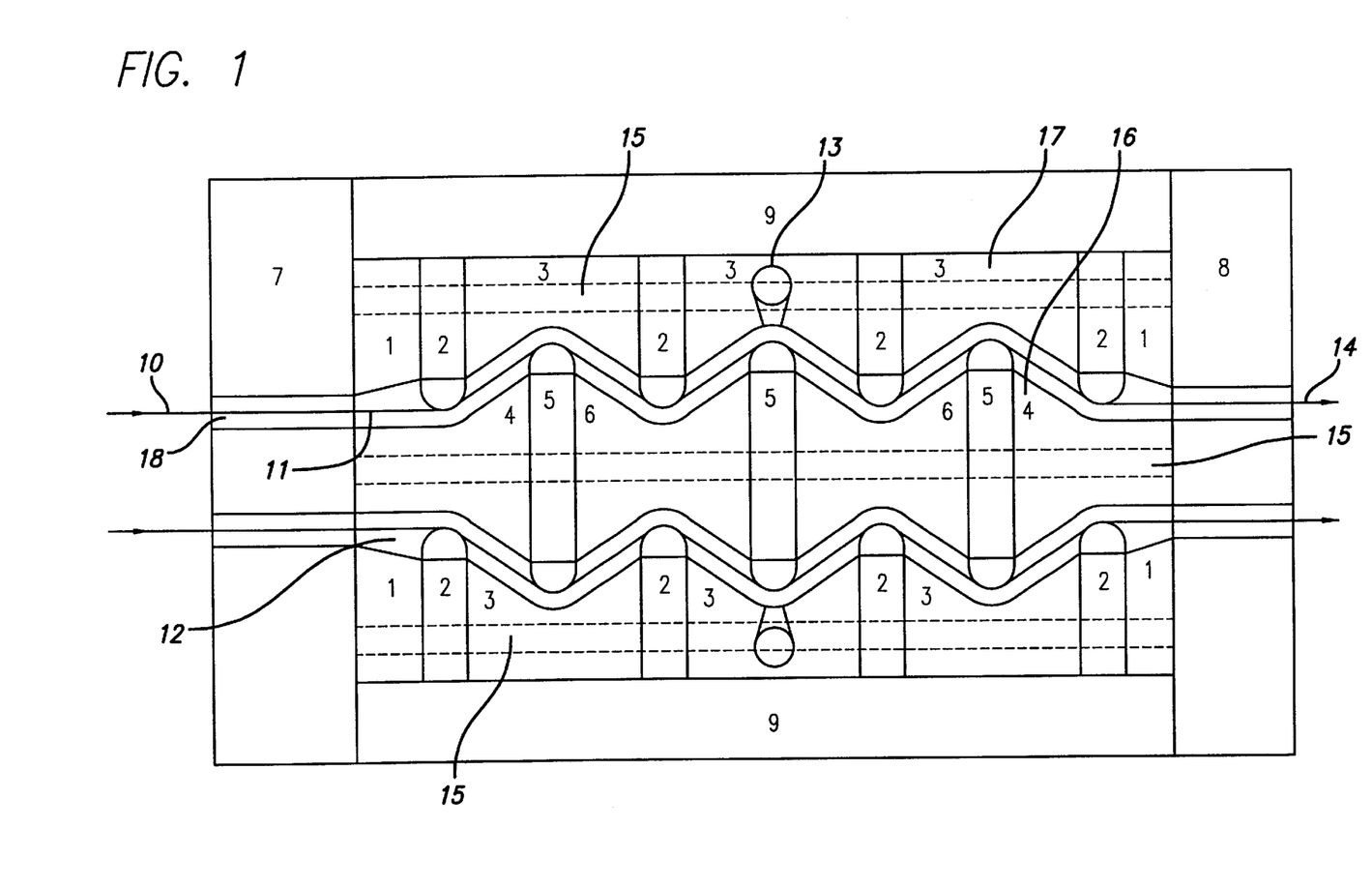
FIG. 1 is a schematic representation showing the first and second members of the present invention alternately arranged in sequence being introduced into the process for coating a long fiber composite though a zigzag shaped tunnel.

To achieve the object of the present invention, the drawing depicted in FIG. 1 shows the first member 2 having an annular shape with a semi-circular ring shaped internal surface and the second member 5 having a disc shape with a semi-circular ring shaped external surface. According FIG. 1, a bundle of fiber filaments 10 with diameter less than 50 $\mu$m are passed to an inlet nozzle 7 and are thus primarily surface-coated with resin heated and melted by a heater 9 at a die inlet. This primarily coated fiber filaments 11 decrease the friction against the metal components when in contact with the semi-circular ring shaped internal surface of the first member 2 and the semi-circular ring shaped external surface of the second member 5. Such primer coating prevents fiber fracture while the fiber filaments are put in contact and thus create friction with the semi-circular ring shaped internal surface of the first member 2. The filaments, passed through the semi-circular ring shaped internal surface of the first member 2, spread to a maximum degree while they are contacting the semi-circular ring shaped external surface of the second member 5 disposed between the front and following first members 2. A series of spreading the fiber filaments is repeated all along the flow path towards to an outlet nozzle 8 so that a rod shape of fiber reinforced strand consisting of completely coated fiber filaments 14 may pass through an outlet nozzle 8. The rod, plate, or tubular shape of fiber reinforced strand obtained above is passed through a cooling reservoir or cooling water, for cooling which makes it possible to produce a rod, plate or tubular shape of fiber reinforced strand continuously.

In FIG. 1, the molten resin is injected in the flow path 12 of the zigzag shape tunnel 18 for coating along the path line of the fibers being shown the distribution of the spreading fiber filaments with an imaginary angle point of cone. The pressure generated during the resin of the immersion die passing through a narrow flow path maximizes the penetration of the resin into the pores of the fiber bed consisting of many filaments ejected from nozzles and simultaneously coats the resin continuously with minimizing the potential of degradation of the resin which would be caused by the inefficient increase of the resin contained. Thus, a rod shape of resin coated strand is prepared by integrating coated resin fiber filaments and pultruding them with a nozzle of desired diameter.

Figure 2:
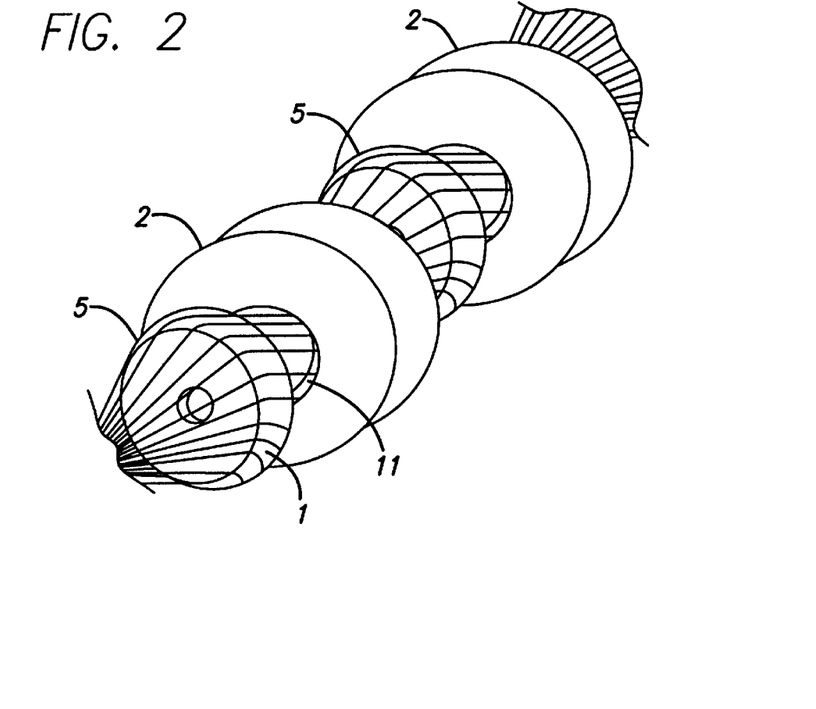
FIG. 2 is a three dimensional diagram showing a pattern of the fiber bundle being spread or integrated so as to be easily impregnated into a resin through the spread of fiber filaments by the usage of the first and second members of the present invention.

FIG. 2 illustrates that the plurality of fiber filaments alternately contact and pass through the semi-circular ring shaped internal surface of the first member 2 and the semicircular ring shaped external surface of the second member 5 for spreading the fiber filaments as wide and uniform as possible. The widely and uniformly spreading of the fiber filaments could be achieved through an alternating arrangement of the plurality of the first member 2 having an annular shape with a semi-circular ring shaped internal surface and the plurality of second member 5 having a disc shape with a semi-circular ring shaped external surface all along the narrow flow path, particularly the alternating arrangement of the second member 5 disposed between the pro and aft first members 2 in series.

While the plurality of fiber filaments are passing through the first member 2 and second member 5, the fiber filaments are spread as wide as possible at the semi-circular ring shaped external surface of the second member 5, and spread relatively narrow at the semi-circular ring shaped internal surface of the first member 2.

Thus, the depth of the fiber filaments for penetrating the resin is shortened when the fiber filaments are placed between the first member 2 and the second member 5. Furthermore, the space between the fiber filaments is so wide that the resin could be easily penetrated.

Still further the distribution of every fiber filament is kept a cone shape having an imaginary angle points as a center so that the distance between two contacting points where every fiber filament contacts both the first and second members, that is a length of fiber path, is kept constant thus minimizing fiber fracture by friction of adjacent filaments.

Figure 3:
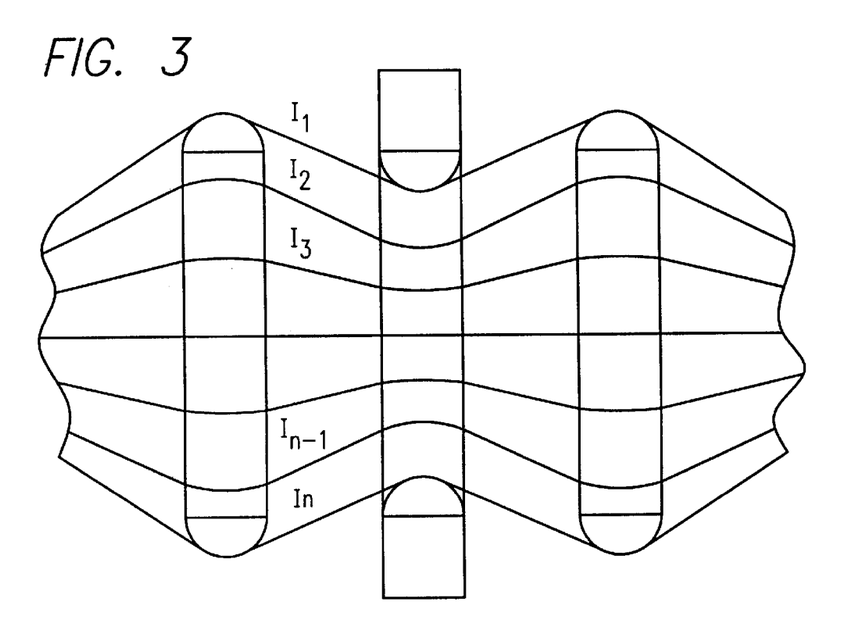
FIG. 3 is a front view of the first and second members of the present invention.

FIG. 3 shows that each filament contacting and passing through the internal surface of the first member 2 and the external surface of the second member 5 along the fiber moving direction has same flow path.

All the fiber filaments have the same flow path ($l_1=l_2=l_3=\ldots =l_{n-1}=l_n$), independent from parameters such as curvature, inner diameter and outer diameter, etc., of the internal surface of the first member 2 and the external surface of the second member 5 and the arrangement such as the distance between the members having the semi-circular ring shaped internal or external surfaces.

Figure 4:
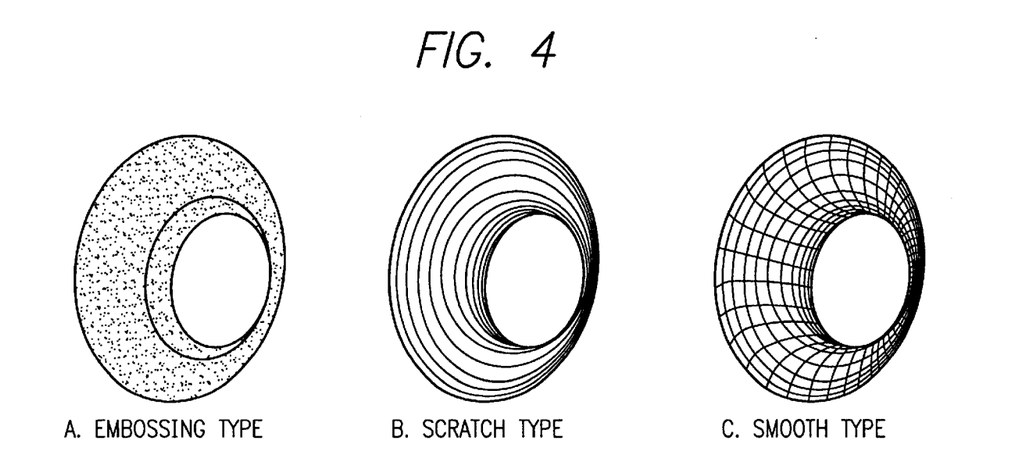
FIG. 4 is collection of various three dimensional views of the first member of the present invention.

FIG. 4 shows three types of the internal surfaces A, B and C for the first member 2 having an annular shape with a semi-circular ring shaped internal surface which is contacted with the fiber filaments. As the case of A, embossing maximizes the contacting area of the filaments at the internal surface of the first members 2 of the semi-circular ring shaped internal surface and also maximizes the penetration of resin into the space or pores between the fiber filaments by the effect of compression to the outer diameter direction from the center of the member of the semi-circular ring shaped internal surface. In the case of B, unevenness having circumferential grooves on the internal or external surfaces of the semi-circular ring shape plays a small reservoir and thus provides the bottom side of the filaments passing through with a sufficient amount of resin, and simultaneously induces a spontaneous penetration of resin into pores of the filaments. On the other hand, the case of C shows the cross section of a simply smooth and internal surface.

Figure 5:
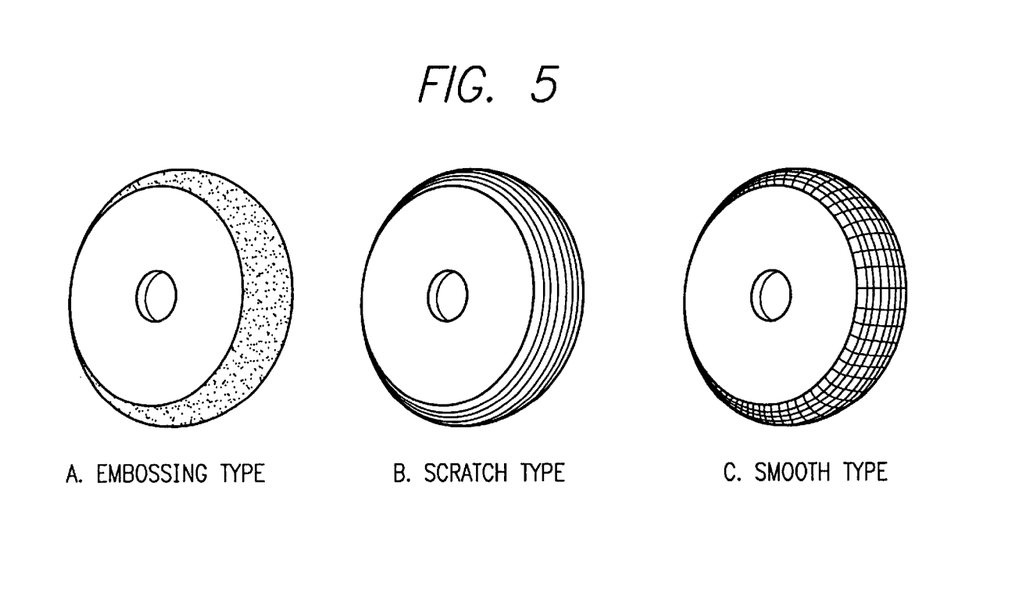
FIG. 5 is collection of various three dimensional views of the second member of the present invention.

The FIG. 5 shows the external surface of second members 5 having a disc shape with a semi-circular ring shaped external surface illustrated in FIG. 2, which shows the same effects as explained in FIG. 4.

Figure 6:
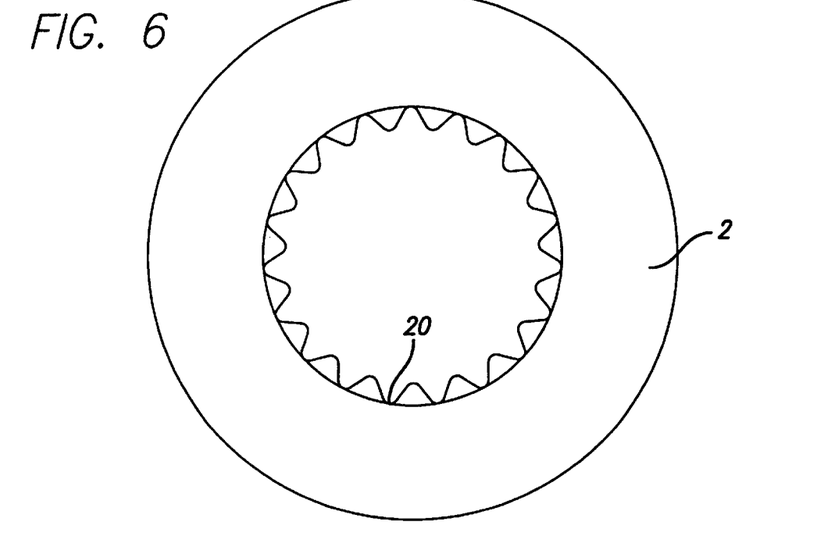
FIG. 6 is a sectional view of the front and last of the first members of the present invention being executed in a concave-convex shape and a large quantity of fiber being reinforced stranded concurrently.

FIG. 6 shows, in the preparation of the rod-shaped fiber reinforced strand, the details of the internal surface of the front and last of the first members 2 in the series shown in FIG. 1, excluding the members shown in FIG. 2. As shown an uneven part 20 of the internal surface of the front first member 2 is used to prevent fiber fracture around the inlet nozzle 7 due to the movement during the continuous molding by fixing the position of a bundle of fibers inputted. A uneven part 20 of the internal surface of the last-positioned first member 2 plays a role in separating almost coated fiber filaments to many rod-shaped strands and at the same time in making it possible to obtain an effect of coating by the compression at the uneven part 20.

Figure 7:
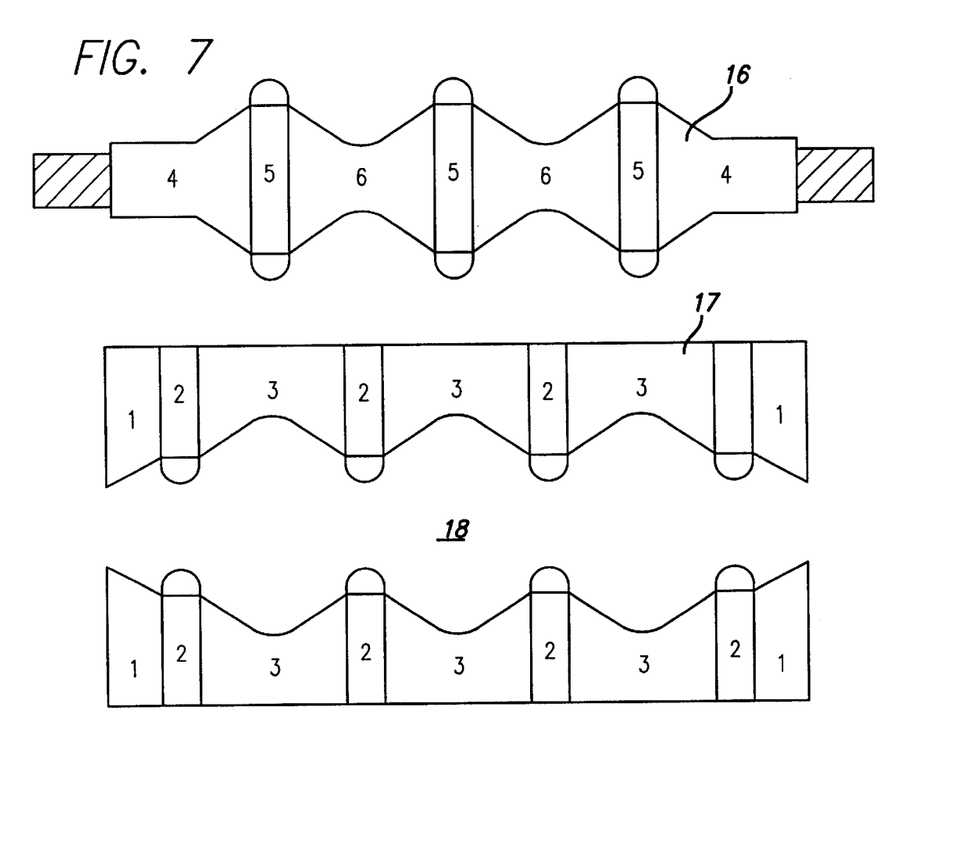
FIG. 7 is a schematic representation showing an inner and outer die members semi-assembled with the first and second members and the first and second connectors, respectively by the axis.

FIG. 7 is a schematic representation showing an outer die member 17 semi-assembled with the plurality of the first members 2 and the first connectors 1, 3, and an inner die member 16 semi-assembled with the plurality of the second members 5 and the second connectors 4, 6. The semi-assembled outer die member 17 and the semi-assembled inner die member 16 are fixed to the inlet nozzle 7 and the outlet nozzle 8 through a plurality of axis 15.

The coating efficiency of the continuous fiber coating process and the apparatus assembly of the present invention described above can be improved by the following method.

In case of coating molten resin to fibers, the resin is preliminarily heated at an entrance nozzle. A large number of fiber bundles is transported through a certain path by first contacting a concave-convex portion of the internal surface of a first member 2 having an annular shape with a semi-circular ring shaped internal surface. Thus, the position of the fiber bundles is fixed so that friction between the fiber filaments and the metal surface which might have occurred at the entrance nozzle can be prevented. The fiber filaments which are passed through the internal of the first member 2 come into contact with the external of the second member 5, so that they are spread to a maximum degree and the resin penetrated into the spreaded fiber filaments. The fiber filaments to which the resin penetration is well controlled as such are then passed to the next surface of the first member 2 thus the coating efficiency of the fibers is improved due to the tension. The fibers are dispersed naturally along the smooth circular curve so that excessive friction is prevented from occurring unlike in a rigid connecting method. By going through series of such processes repeatedly, a resin-fiber composite having excellent resin-penetration provided by the tension on the fiber, excellent pulling rate of equipment, and measurements such as curvature, inside diameter, outside diameter of the internal and external surfaces of the first and second members 2, 5 as shown in FIG. 4 and FIG. 5 and the arrangement of the distance between these two members are obtained.

At the same time, the molten resin injected through a resin inlet 13 which is located at a center of the die flows toward both ends of the inlet nozzle and outlet nozzle. Approximately, a half amount of the injected molten resin through the resin inlet 13 will flow toward the inlet nozzle from the center of the die. And, the rest half amount of the molten resin will flow toward the outlet nozzle from the center of the die. Thus, the molten resin will exert pressure toward the both ends of the inlet and outlet nozzles. The fiber filaments is contacted with counter flow of the pressurized molten resin through front half of the narrow flow path, and contacted with parallel flow of the pressurized molten resin through rear half of the narrow flow path. The pressure of the pressurized molten resin varies through the narrow flow path due to variation of cross sectional area of the zigzag shaped tunnel.

Therefore, the molten resin can readily penetrate into the pores of the fiber layers and minimizes the risk of resin decomposition caused by inefficient enlargement of resin flow path, therefore, in spite of short length of die, the completely resin-coated fiber composite wherein the resin heat decomposition doesn't occur can be produced.

By introducing these members 2, 5 having the semi-circular ring shaped internal or external surface to establish a resin transport (flow) path inside a molding, die as shown in FIG. 1 above, the risk of resin decomposition caused by inefficient enlargement of resin flow path is minimized. The effect of the pressure generated between the two sides of the fiber bed layer caused by the resin flow inside the narrow flow path and the effect of the fibers coating can be maximizing spreading the fiber filaments to a maximum degree. At the same time, optimum conditions between the production rate and the coating effect can be sent by using various dimensions, numbers and arrangements of the members having the semi-circular ring shaped internal or external surface.

When producing such well-coated fiber filament into a rod-shaped fiber strengthening strand, the concave-convex portion 20 of the internal surface depicted in FIG. 6 is passed through the semi-circular ring shaped internal surface of the first member 2 disposed at the last member in the series to make a shape of rod first, and passed again through the exit nozzle to complete secondary molding. The fiber strengthening strand of rod shaped which comes out of the die is then passed though a cooling bath and solidified. The rod-shape fiber strengthening strand with a fixed length of at least 2 mm is prepared by using a pelletizer.

The effect of the present invention is that, by introducing these members having the semi-circular ring shaped internal or external surface so as to establish a resin transport path inside a molding die, the risk of resin decomposition caused by inefficient enlargement of the resin flow path is minimized. The effect of coating of fiber with the resin by spreading the fiber filaments to a maximum degree can be maximized, even at high production rate, because all the fiber filaments passed toward an imaginary angle point of cone shape of the resin immersion die and have the same flow path ($1_1=1_2=1_3=\ldots=1_{n-1}=1_n$) independent from parameters such as curvature, inner diameter and outer diameter, etc., of the semi-circular ring shaped internal surface of the member and the semi-circular ring shaped external surface of the member and the arrangement such as the distance between the members having the semicircular ring shaped internal or external surface.

At the same time, optimum conditions between the production rate and the coating effect can be set by using different dimensions, numbers and arrangements of the members having the semi-circular ring shaped internal or external surface.

What is claimed is:

1. A process for preparing a resin coated fiber composite of a rod-shape, tubular-shape or plate-shape, a plurality of fiber filaments being continuously coated in a manner of alternating sequence through a relatively narrow flow path of a zigzag shaped tunnel formed between an inner die member and an outer die member, the process comprising steps of:

spreading said plurality of fiber filaments by passing said fiber filaments through a first member having a convex-concave portion of a semi-circular ring shaped internal surface to prevent fracture of said fiber filaments, and sequentially, by tensioning through a series of second members having a semi-circular ring shaped external surface and the first member having the semi-circular ring shaped internal surface all along the relatively narrow flow path of the zigzag shaped tunnel to maximize molten resin penetrating surface area;

impregnating pressurized molten resin into said plurality of widely spread fiber filaments continuously by passing said fiber filaments through said series of the first and second members all along the relatively narrow flow path of the zigzag shaped tunnel to maximize molten resin penetrating time, wherein said pressurized molten resin is filled in the relatively narrow flow path of the zigzag shaped tunnel, supplied from a plurality of resin inlet ports disposed at a center surface section of the outer die member, and exerted toward both ends of inlet and outlet nozzles, and wherein pressurization of the molten resin maximizes penetrating the molten resin into pores of the fiber filaments and minimized possibility of resin degradation;

stranding a plurality of resin-coated fiber filaments continuously by passing through a final set of the first member having the convex-concave portion of the semi-circular ring shaped internal surface for strengthening the fiber filaments; and integrating and pultruding said plurality of resin-coated fiber filaments continuously by passing along the relatively narrow flow path of the zigzag shaped tunnel to form a desired diameter through the outlet nozzle.

2. The process for preparing a resin coated fiber composite according to claim 1, wherein said fiber filaments are passed through said zigzag shaped tunnel to contact continuously with said pressurized molten resin in said rela tively narrow flow path, the fiber filaments are dispersing while the fiber filaments are forwarding to an imaginary angle point of a cone shape along with said semi-circular ring shaped internal surface of said first member and said semi-circular ring shaped external surface of said second member alternately, and said fiber filaments are maintained constant length and tension all along the relatively narrow flow path of the zigzag shaped tunnel.

3. The process for preparing a resin coated fiber composite according to claim 2, wherein said fiber filaments is contacted with counter flow of said pressurized molten resin through front half of the relatively narrow flow path, and contacted with parallel flow of said pressurized molten resin through rear half of the relatively narrow flow path, and pressure of said pressurized molten resin varies through the relatively narrow flow path due to variation of cross sectional area of the zigzag shaped tunnel.

4. The process for preparing a resin coated fiber composite according to claim 2, wherein tension exerted on the fiber filaments is less than 80 Kg-force per a fiber-reinforced strand having a diameter from 1 to 10 mm.

5. The process for preparing a resin coated fiber composite according to claim 1, wherein the resin coating is a thermoplastic resin having viscosity of from 100 CP (centpoise) to 5,000,000 poise.

* * * * *